United States Patent
Morris et al.

(10) Patent No.: US 10,868,814 B2
(45) Date of Patent: Dec. 15, 2020

(54) SYSTEM AND METHOD FOR FLOW-BASED ARCHITECTURE

(71) Applicant: Samsung Electronics Co., Ltd., Suwon-si (KR)

(72) Inventors: Tristan Morris, Sunnyvale, CA (US); Amir Rahmati, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 16/195,512

(22) Filed: Nov. 19, 2018

(65) Prior Publication Data

US 2019/0334906 A1    Oct. 31, 2019

Related U.S. Application Data

(60) Provisional application No. 62/664,784, filed on Apr. 30, 2018.

(51) Int. Cl.
  *H04L 29/06* (2006.01)

(52) U.S. Cl.
  CPC .......... *H04L 63/10* (2013.01); *H04L 63/0823* (2013.01)

(58) Field of Classification Search
  CPC ... H04L 63/10; H04L 63/101; H04L 63/0823; H04L 29/06823; H04L 29/06729
  See application file for complete search history.

(56) References Cited

U.S. PATENT DOCUMENTS

| | | | |
|---|---|---|---|
| 7,076,804 B2 | 7/2006 | Kershenbaum et al. | |
| 8,424,056 B2 | 4/2013 | Naganuma | |
| 8,646,027 B2 | 2/2014 | Malaviarachchi et al. | |
| 9,067,097 B2 | 6/2015 | Lane et al. | |
| 9,275,221 B2 | 3/2016 | Singh | |
| 9,635,317 B1* | 4/2017 | Ludwig | H04N 21/4408 |
| 9,649,558 B2 | 5/2017 | Stafford et al. | |
| 9,866,391 B1* | 1/2018 | Crites | H04L 9/32 |
| 2006/0080726 A1 | 4/2006 | Bodlaender et al. | |
| 2009/0328180 A1* | 12/2009 | Coles | G06F 21/6281 726/9 |
| 2010/0275247 A1* | 10/2010 | Jerichow | H04N 21/47202 726/4 |
| 2013/0024939 A1 | 1/2013 | Glew et al. | |
| 2013/0097517 A1* | 4/2013 | Reiss | G06F 21/6218 715/741 |
| 2015/0026465 A1* | 1/2015 | Cucinotta | H04L 63/102 713/168 |
| 2015/0089637 A1 | 3/2015 | Centonze et al. | |

(Continued)

FOREIGN PATENT DOCUMENTS

| | | |
|---|---|---|
| EP | 1950680 A1 | 7/2008 |
| JP | 2006522965 A | 10/2006 |

(Continued)

*Primary Examiner* — Sher A Khan

(57) ABSTRACT

A method for flow-based authorization includes receiving, at an electronic device, an input from an input agent and passing the input through a path of components to determine one or more action agents. Further, the method includes determining a flow for the input, wherein the flow comprises a representation of all possible paths between the input agent and the one or more action agents and providing a common language permission statement based on the flow.

17 Claims, 7 Drawing Sheets

(56) References Cited

U.S. PATENT DOCUMENTS

| 2015/0363577 | A1 | 12/2015 | Shah et al. |
| 2016/0110012 | A1 | 4/2016 | Yim et al. |
| 2016/0364927 | A1 | 12/2016 | Barry et al. |
| 2017/0060266 | A1 | 3/2017 | Gao et al. |
| 2017/0318023 | A1* | 11/2017 | Seed ................... H04L 63/105 |
| 2018/0131696 | A1* | 5/2018 | Wade ..................... G06F 21/40 |
| 2019/0108330 | A1* | 4/2019 | Sikder .................. G06F 21/577 |
| 2019/0334918 | A1* | 10/2019 | AbiEzzi ............. H04L 63/0281 |

FOREIGN PATENT DOCUMENTS

| JP | 6214088 B2 | 10/2017 |
| KR | 10-2011-0040767 A | 4/2011 |

\* cited by examiner

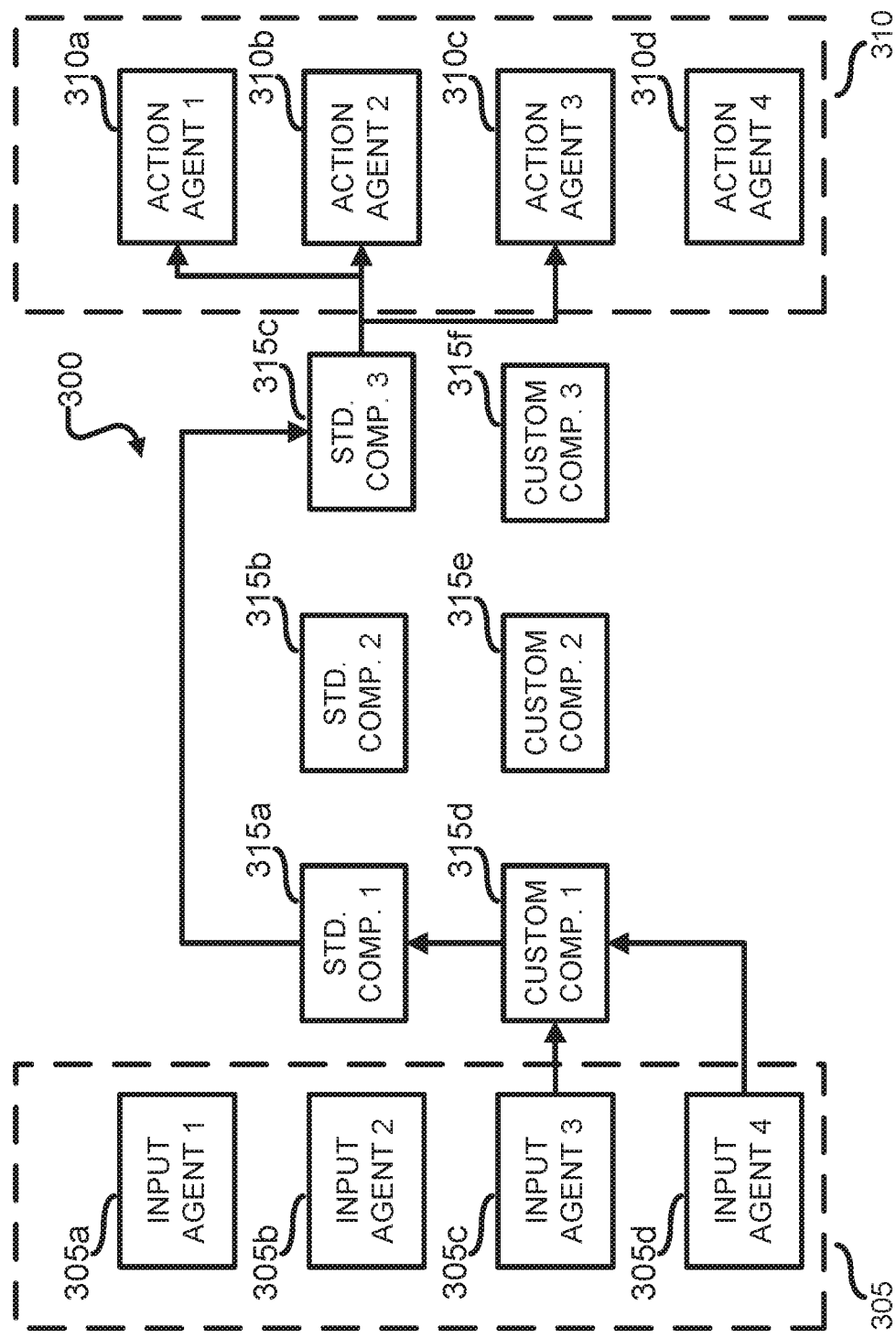

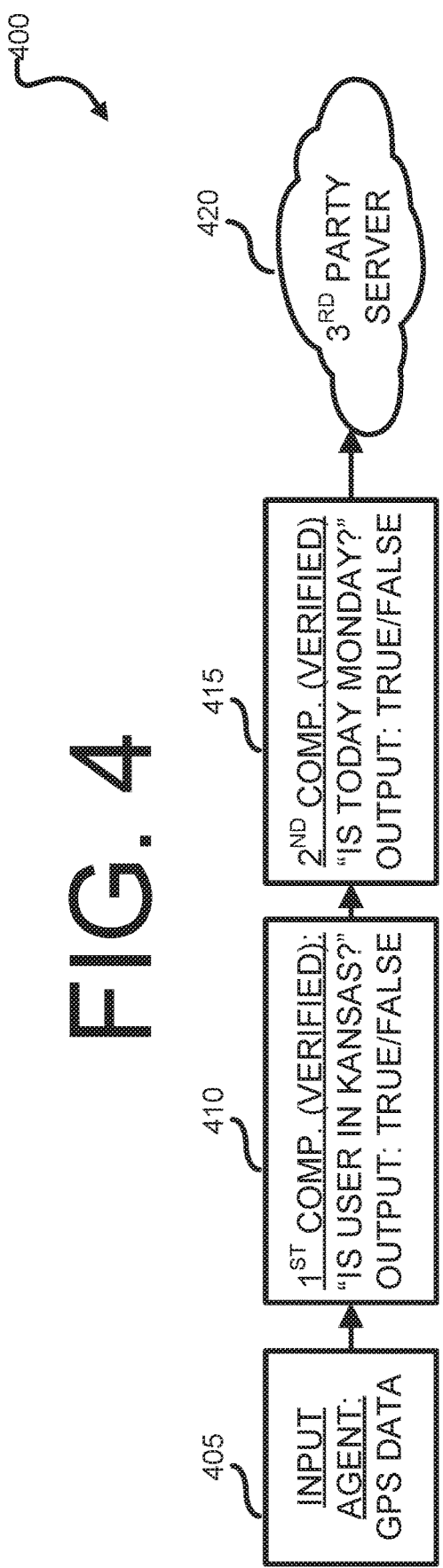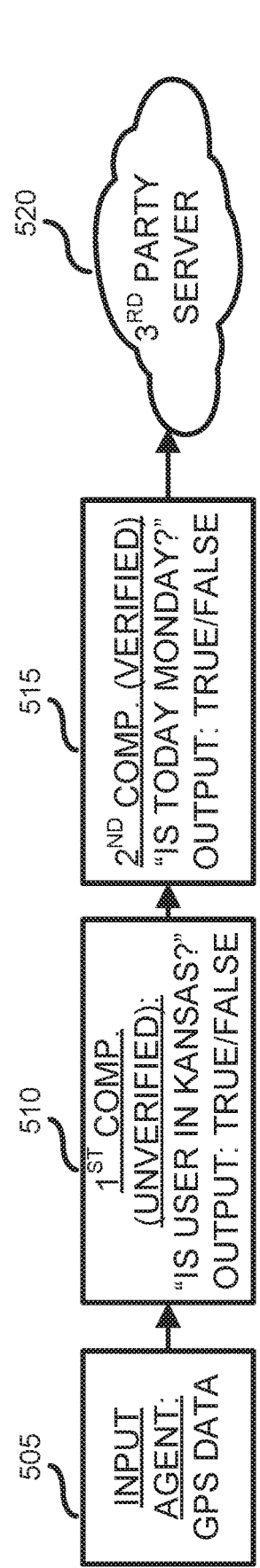

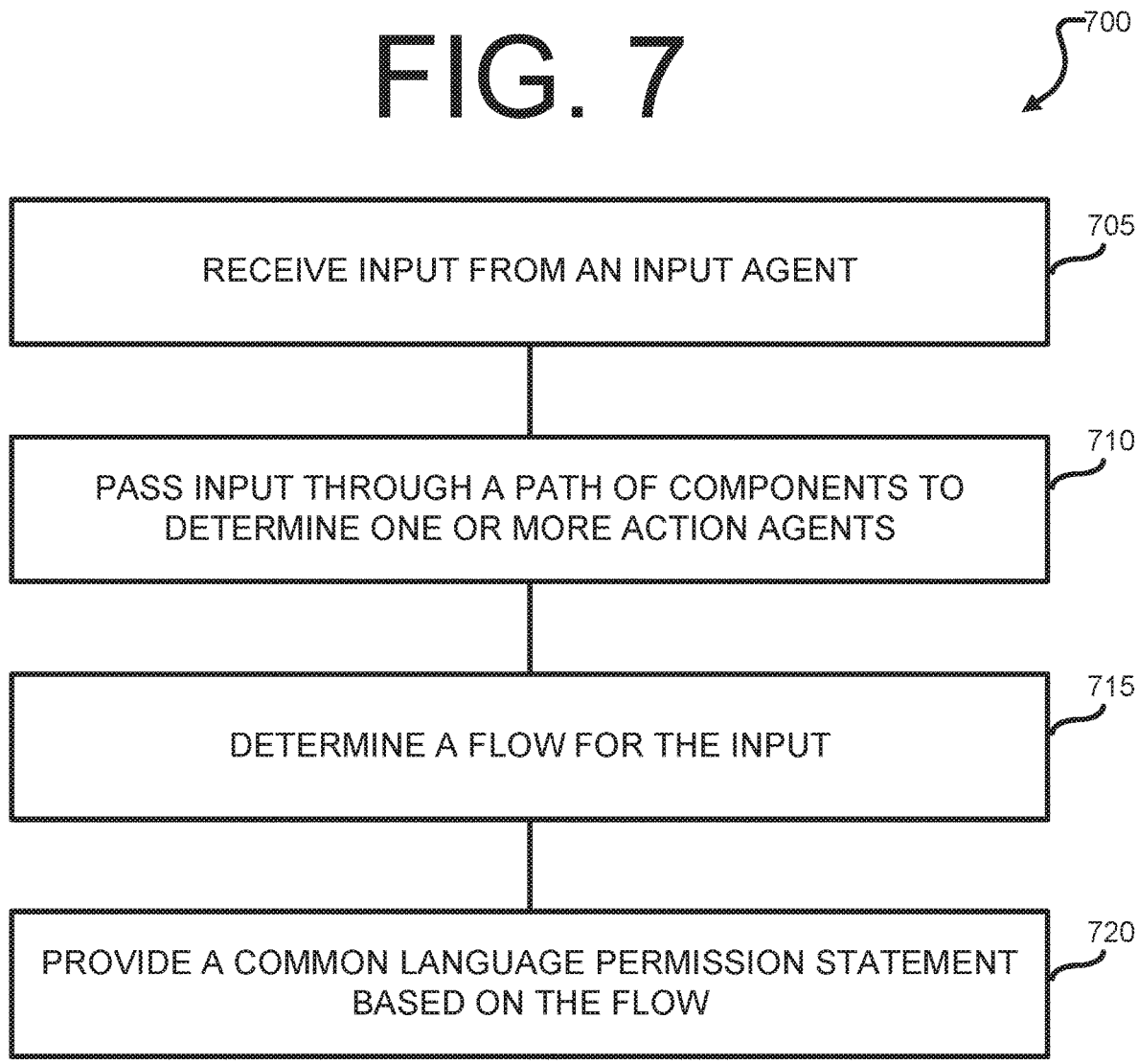

SYSTEM AND METHOD FOR FLOW-BASED ARCHITECTURE

CROSS-REFERENCE TO RELATED APPLICATION AND CLAIM OF PRIORITY

This application claims priority under 35 U.S.C. § 119(e) to U.S. Provisional Patent Application No. 62/664,784 filed on Apr. 30, 2018. The above-identified provisional patent application is hereby incorporated by reference in its entirety.

TECHNICAL FIELD

This disclosure relates generally to implementing permission controls for computer applications. More specifically, this disclosure relates to a system and method for a flow-based architecture for implementing permission controls.

BACKGROUND

The advent of the internet of things (IoT) and more generally, the proliferation of networked devices capable of presenting other devices, or resources of a device (such as the camera of a smartphone, or the heating element of a Wi-Fi enabled crock pot) with malicious commands presents an expanded range of threats to the integrity of users' privacy and data. For example, a coupon-scanning application may be generally authorized to access the camera of a device, the authorization having been granted based on a user's expectation and trust that the application will only access the camera to scan coupons. However, such general access controls can be susceptible to abuse of the permissions by malicious actors, who may use the application's permission to access camera data in unforeseen and unwanted contexts, such as to record a user's conversations.

Additionally, realization of the full potential of a broad suite of networked devices implies the creation a broad suite of services and applications for orchestrating collaborative operation of the various devices. Returning to the above-described examples of a smartphone and a Wi-Fi-enabled crock pot, users may want the crock pot to have the ability to cook food in a way that allows the crock pot to be controlled remotely from a user's smartphone and ensures that the food is ready to eat (and not overcooked) when the user returns home. Achieving this functionality may require developing an application which provides the smartphone control over the crockpot, utilizes potentially sensitive data on the smartphone (for example, data indicating where the user lives and whether or not she is home), and ideally, addresses the security concerns discussed above. As the number of devices and desired functionalities increases, the number of applications and services which need to be created to implement these desired functionalities likewise increases.

Thus, simultaneously addressing the demand for granular permissions to potentially sensitive data between networked actors, as well as the demand for rapid development of applications and services which utilize potentially sensitive data to provide enhancements in the functionality of devices remains a source of technical challenges and opportunities for improvement.

SUMMARY

This disclosure provides a system and method for a flow-based architecture for permission controls.

In a first embodiment, a method for flow-based authorization includes receiving, at an electronic device, an input from an input agent and passing the input through a path of components to determine one or more action agents. Further, the method includes determining a flow for the input, wherein the flow comprises a representation of all possible paths between the input agent and the one or more action agents and providing a common language permission statement based on the flow.

In a second embodiment, an apparatus comprises a processor and a memory. Additionally, the memory includes program code, which, when executed by the processor, causes the apparatus to receive, at the apparatus, an input from an input agent and pass the input through a path of components associated with the application to determine one or more action agents. Further, the program code, when executed by the processor, causes the apparatus to determine a flow for the input, wherein the flow comprises a representation of all possible paths between the input agent and the one or more action agents and provide a common language permission statement based on the flow.

In a third embodiment, a non-transitory computer program includes program code, which, when executed by a processor, causes an apparatus to receive, at the apparatus, an input from an input agent and pass the input through a path of components associated with the application to determine one or more action agents. Additionally, the program code, when executed by the processor, causes the apparatus to determine a flow for the input, wherein the flow comprises a representation of all possible paths between the input agent and the one or more action agents and provide a common language permission statement based on the flow.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 3A illustrates an example of a flow through a set of application components according to some embodiments of this disclosure;

FIG. 4 illustrates an example of generating a flow-based permission statement according to various embodiments of this disclosure;

FIG. 5 illustrates an example of generating a flow-based permission statement according to various embodiments of this disclosure;

FIG. 7 illustrates an example of operations of a method for implementing flow-based permissions according to various embodiments of this disclosure.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
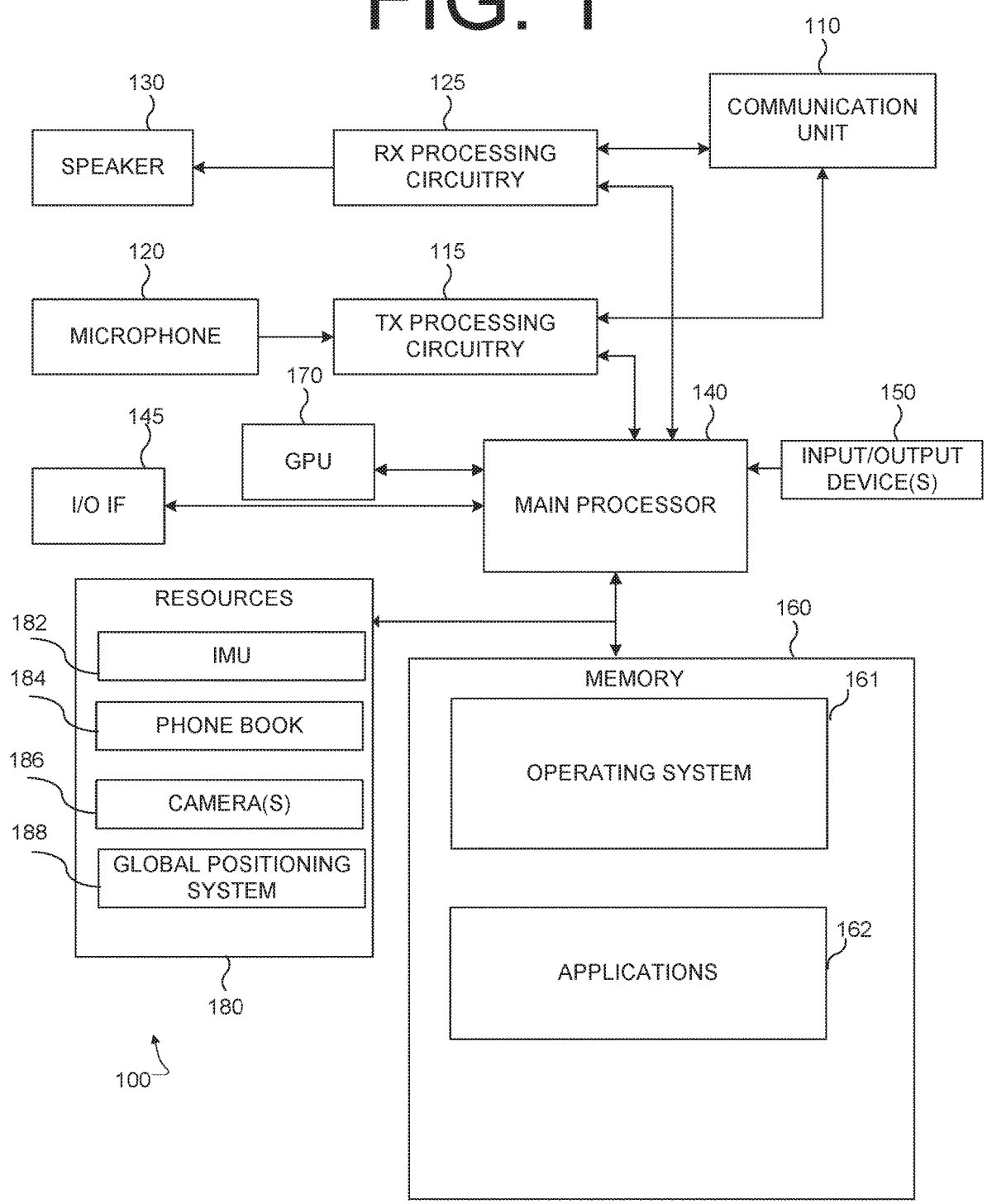
FIG. 1 illustrates an example of an electronic device for implementing flow-based permissions according to various embodiments of this disclosure.

FIG. 1 illustrates a non-limiting example of a device for implementing flow-based permission controls according to some embodiments of this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in the non-limiting example of FIG. 1, the device 100 includes a communication unit 110 that may include, for example, a radio frequency (RF) transceiver, a BLUETOOTH® transceiver, or a WI-FI® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications for which a user of device 100 wishes to provide with purpose-specific, flow-based permissions to resources of the device. As one non-limiting example, applications 162 may include a coupon-clipping application, for which a user has provided flow-based permission to access camera 186 to capture image data to be transmitted to a trusted host machine associated with the coupon application.

The communication unit 110 may receive an incoming RF signal, for example, a near field communication signal such as a BLUETOOTH® or WI-FI™ signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with device 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1. For example, according to certain embodiments, device 100 can further include a separate graphics processing unit (GPU) 170.

According to certain embodiments, device 100 includes a variety of additional resources 180 which can, if permitted, be accessed by applications 162. According to certain embodiments, additional resources 180 include an accelerometer or inertial motion unit 182, which can detect movements of the electronic device along one or more degrees of freedom. Additional resources 180 include, in some embodiments, a user's phone book 184, one or more cameras 186 of device 100, and a global positioning system 188.

Although FIG. 1 illustrates one example of a device 100 for providing flow-based permission controls, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
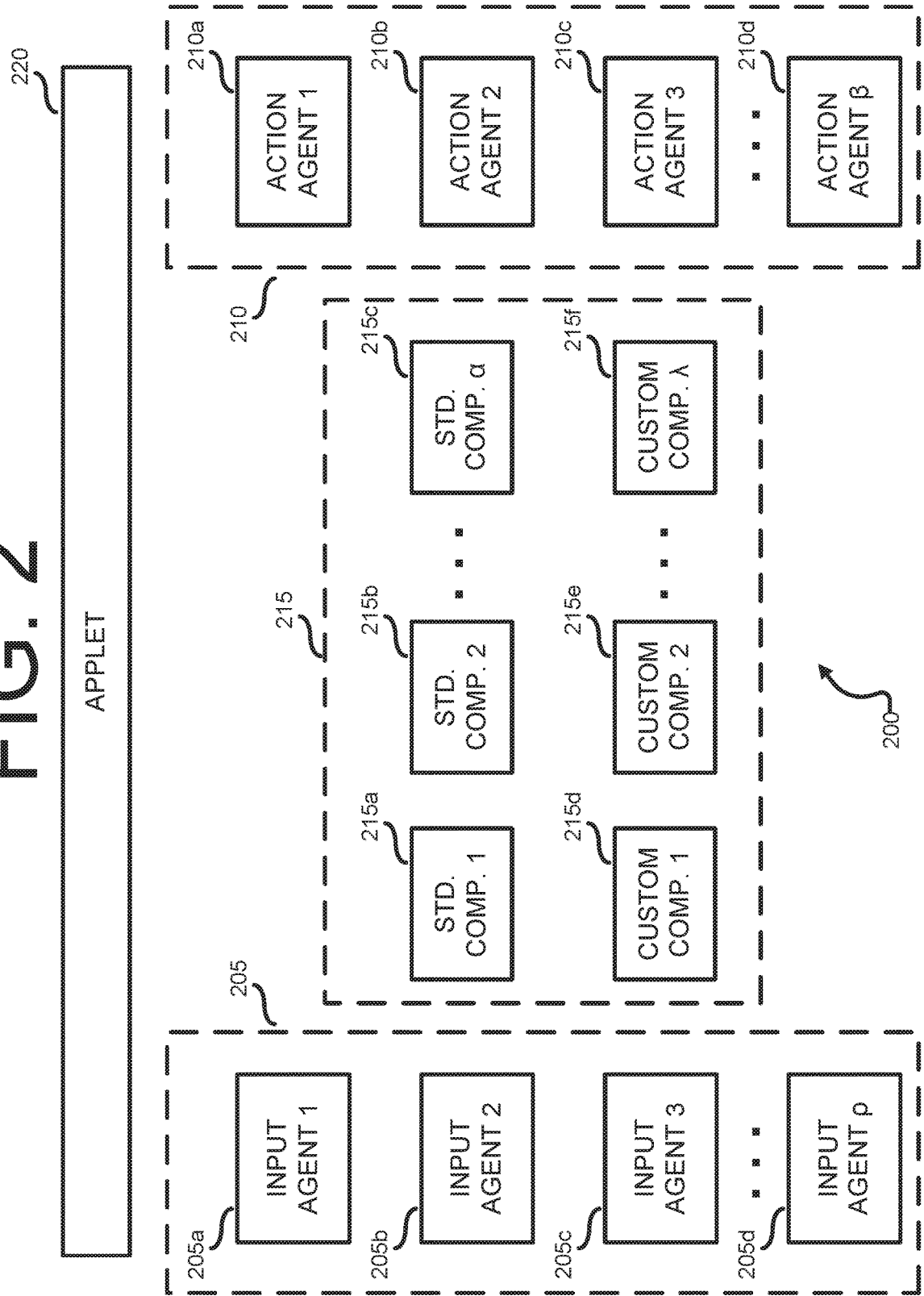
FIG. 2 illustrates an example of an application architecture according to certain embodiments of this disclosure.

FIG. 2 illustrates an example of an application architecture 200 for implementing flow-based permissions according to certain embodiments of this disclosure.

As discussed herein, the technical challenges associated with realizing the full potential of a dense environment of networked devices include the development of secure applications in a way that keeps pace with both the introduction of new and improved devices as well as users' rapidly evolving and arbitrary application requirements (for example, an unforeseen desire to communicate with a Wi-Fi enabled crockpot via a wearable device, such as a smart watch).

Additionally, the technical challenges of developing the above-described applications include managing permissions for access to potentially sensitive data and resources. One approach to managing permissions is to utilize access-control based permissions, whereby an application or entity obtains a user's permission to access resources under a specified set of circumstances. However, such access-control based permissions generally fail to impose limits on how the applications can use the resources when available.

Recent experience, such as documented incidents of malicious actors obtaining access to microphones and cameras of IoT devices through application permissions, have shown that abuse of access-based permissions presents a serious and non-hypothetical problem.

Referring to the non-limiting example of FIG. 2, application architecture 200 provides a framework for implementing, as an alternative to access-control based permissions, flow-based permissions. According to certain embodiments, flow-based permissions provide individual applications or entities with access with specific resources or abilities (e.g., the ability to provide a specific item of data to a specific party), and the full flow of commands and data relating to those specific resources or abilities is tracked.

The technical challenges associated with implementing flow-based permissions include, without limitation, extensibility and flexibility. While flow-based permissions can be manually coded into pre-built applications, this approach can be labor-intensive and difficult to implement as the architecture of the application changes across versions of the application. For this reason, many developers consider flow-based permissions impractical and opt for access-control based permissions instead.

According to certain embodiments of this disclosure, application architecture 200 addresses the technical challenges associated with implementing flow-based permissions in a way that is extensible and permits flexibility in application design. As shown in the illustrative example of FIG. 2, application architecture 200 comprises a toolkit for building applications such that the flow of commands and data in an application can be readily tracked and monitored, without the need for manually coding flow-based permissions into the system.

Referring to the non-limiting example of FIG. 2, application architecture 200 comprises four basic categories of elements—one or more input agents 205, one or more action agents 210, one or more components 215 and an applet 220.

According to certain embodiments, input agents 205 comprise applications or processes of a device which capture data or take actions for which a user's permission may be sought. Examples of input agents 205 include, without limitation, resources of a device (for example, microphone 120 or camera 186 in FIG. 1), or a process (for example, a call to a web service which performs a computationally expensive task, such analyzing image data to determine whether a face in an image matches a face of a person of interest). Further examples of input agents include, for example, a GPS sensor on a device.

As shown in the non-limiting example of FIG. 2, application architecture 200 contemplates that, for a given device, there can be multiple input agents. In the non-limiting example of FIG. 2, input agents 205 comprise first input agent 205a, second input agent 205b, third input agent 205c, and $\rho^{th}$ input agent 205d. In the non-limiting example of FIG. 2, $\rho$ is an arbitrary integer, reflecting the fact that in certain embodiments according to this disclosure, a wide range of input agents 205 are possible and the number of input agents 205 can be both arbitrary and independent of the number of other types of components within application architecture 200.

In various embodiments according to this disclosure, action agents 210 comprise devices or processes which are actuated as part of a flow of data or commands which begins with the provision of an input to an input agent. According to certain embodiments, action agents 210 are processes on the same computing platform as input agents 205. As one non-limiting example an action agent may be a function which displays push notifications. By way of example, in certain embodiments, input agents 205 may include a function which ingests GPS data from a user's device, and action agents 210 may further include a function which outputs a push notification based on a determination of whether a device is sufficiently close to a facility to receive notifications regarding conditions at the facility.

As shown in the non-limiting example of FIG. 2, application architecture 200 contemplates that, for a given device, there can be more than one output agents. In the non-limiting example of FIG. 2, action agents 210 comprise first action agent 210a, second agent 210b, third action agent 210c and $\beta^{th}$ action agent 210d. In the non-limiting example of FIG. 2, $\beta$ is an arbitrary integer, reflecting the fact that, in various embodiments according to this disclosure, a variety of action agents 210 are possible, and that the number of action agents 210 can be arbitrary and independent of the number of other types of components within application architecture 200.

As shown in the non-limiting example of FIG. 2, components 215 comprise isolate modules of code which perform one or more specific functions for which the flow of data can be well modeled. According to various embodiments, each component of components 215 receives an input from an input agent of input agents 205 or another component of components 215 and provides an output to an action agent of action agents 210. According to certain embodiments, one or more components of components 215 may be executed on a cloud-based computing platform. In some embodiments, one or more components of components 215 is implemented as a black box container (for example a Kubernetes container or an Amazon Web Services container). For example, a process implementing an algorithm which receives, as an input, an image, and outputs a Boolean true/false statement on whether a bird is in the image.

According to various embodiments, components within set of components 215 may be categorized according to the extent to which the component's utilization of data is known and can be modeled. In certain embodiments, there may a first tranche of applications comprising applications which properties are verified, or known to conform to a specified set of design standards. In the non-limiting example of FIG. 2, components which have been verified, or otherwise confirmed as adhering to one or more relevant design standards are designated as "standard components" and comprise first standard component 215a, second standard component 215b, and $\alpha^{th}$ standard component 215c. As indicated by the numbering scheme utilized in FIG. 2, wherein $\alpha$ represents an arbitrary integer, embodiments according to this disclosure can have an arbitrary and changeable number of standard components within set of components 215.

According to certain embodiments, in addition to verified or standard components (for example, standard components 215a through 215c in FIG. 2), there can be one or more secondary tranches of components, which may not be verified or otherwise confirmed to adhere to the same design standards as "standard" or "verified" components.

For example, in certain embodiments of an application architecture 200, the developer of devices (for example, smart phones, IoT devices, or wearable devices) providing a set of input agents 205 and action agents 210, may also provide a cloud computing platform on which instances of components (for example, cloud computing containers) within set of components 215 can execute. In this explanatory example, the developer may also write components hosted on the cloud platform. Having developed these components and also, potentially having access to the underlying source code, the flow of data within a developer-developed component can be fully understood and verified by the developer, and can be considered a "verified" or "standard" component.

At the same time, to encourage extensibility and adoption of its implementation of application architecture, the developer may allow outside parties to develop third-party components which can be hosted on the developer's platform. Having played no part in the development of such third-party components, the developer and host of the developer's platform do not have the same assurances regarding the flow of data and commands through third-party components. In various embodiments, third party components are cannot be verified or confirmed to adhere to the developer's design specifications the way standard components (for example standard component 215a in FIG. 2) can. Referring to the non-limiting example of FIG. 2, third-party components belong to a second tranche of components, referred to as unverified or "custom" components. In the non-limiting example of FIG. 2, the set of components 215 includes first custom component 215d, second custom component 215e and $\lambda^{th}$ custom component 215f. As indicated by the numbering scheme in FIG. 2, wherein $\lambda$ represents an arbitrary integer, the number of unverified, or otherwise "custom" components within set of components 215 can be arbitrary, and various embodiments according to this disclosure can have more or fewer components than depicted in the non-limiting example of FIG. 2.

According to various embodiments, application architecture 200 enables developers to rapidly create ad hoc applications by specifying logical connections between input agents within set of input agents 205 to one or more components within a set of components 215 and outputs at one or more action agents within a set of action agents 210. Thus, rather than coding an entire application from scratch, in various embodiments according to this disclosure, a developer can instead write an applet specifying the logical connections (for example, "take the output of component "A" as an input to component "B," or "if the output of component "C" is "true" then pass a value to component "D") between elements within application architecture 200.

Referring to the non-limiting example of FIG. 2, applet 220 comprises one or more small applications which specify the logical connections between components and input and output agents. According to some embodiments, an application built within application architecture 200 may be based on a single applet 220. In various embodiments, an application built within application architecture 200 may be based on multiple applets 220.

FIG. 3A illustrates an example of a flow through a set of application components according to various embodiments of this disclosure.

Referring to the non-limiting example of FIG. 3A, an example of an application architecture 300 is shown. According to certain embodiments, application architecture 300 includes a set of input agents 305, comprising first input agent 305a, second input agent 305b, third input agent 305c and fourth input agent 305d. In this illustrative example, the input agents of set of input agents 305 comprise resources and processes of a user device (for example, a camera and microphone of a device such as device 100 in FIG. 1).

In some embodiments, application architecture 300 also includes a set of action agents 310, comprising first action agent 310a, second action agent 310b, third action agent 310c and fourth action agent 310d. In the illustrative example of FIG. 3A, each agent within set of action agents 310 is a process or resource of the user device, which is actuated based on how the components between set of input agents 305 and set of output agents 310 process an input. For example, an action agent within set of action agents 310 may include a process which sends an image in the camera roll to a third party service, or which provides a user with a "push" notification as to a determined condition (for example, that the user is now sufficiently proximate to a secure facility that she can log onto its access controlled Wi-Fi network)).

Referring to the non-limiting example of FIG. 3A, application architecture 300 further comprises a set of six components, numbered 315a through 315d, which can be logically connected to input agents within set of input agents 305, output agents within set of output agents 310, and each other. Further, as shown in this non-limiting example, the components include both standard components (numbered 315a through 315c) and "custom" components (numbered 315d through 315f). According to certain embodiments, a set of logical connections between each of components 315a through 315f is specified by a piece of code (for example, an applet, such as applet 220 in FIG. 2). In some embodiments, the logical connections between components are specified by a trigger-action platform. In various embodiments, the logical connections between elements of application architecture 300 are specified by one or more pieces of hardware, such as an IoT management hub.

As shown in the non-limiting example of FIG. 3A, inputs can be provided to at least two input agents (in this case third input agent 305c and fourth input agent 305d). Upon receipt, the inputs are processed and data passed along to components within the set of components and action agents according to logical connections (for example, conditionals of the form "if this, then that") specified through control logic, such as an applet or trigger-action platform. For a given set of input agents, components, and action agents, there is a set of possible paths (also referred to as a "flow") from a given set of input agents to a given set of output agents.

In the non-limiting example of FIG. 3A, the flow for a configuration of input agents, components and action agents is depicted both graphically, as a set of arrows showing the paths of data within the depicted elements of application architecture 300.

Figure 3B:
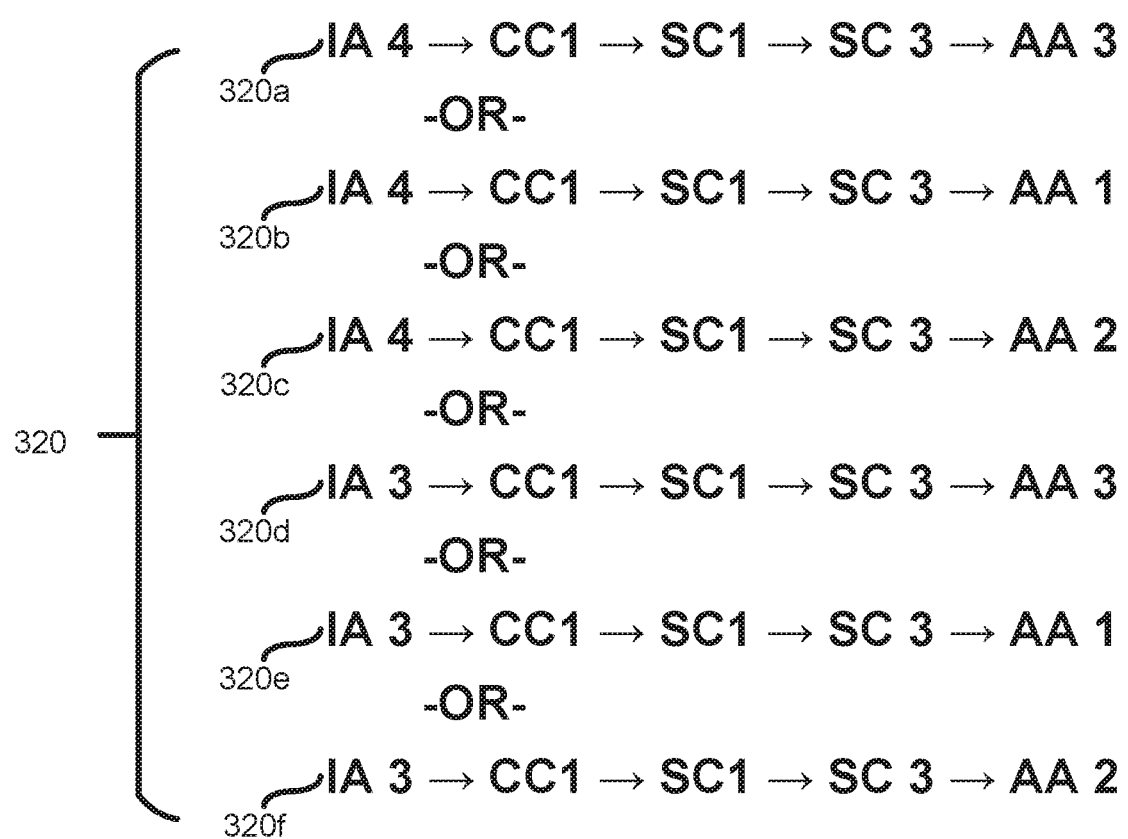
FIG. 3B illustrates an example of a flow through a set of application components according to various embodiments of this disclosure.

FIG. 3B illustrates an example of a flow through a set of application components according to certain embodiments of this disclosure. Specifically, FIG. 3A provides a textual representation of the flow depicted graphically in FIG. 3A. In the non-limiting example of FIG. 3B, flow 320 is represented as a set of paths.

As shown in the non-limiting example of FIG. 3B, the logical connections between elements of application architecture 300 specified by an applet or other control logic result in a flow 320 which contains six possible paths (designated 320a through 3200 connecting input agents 305c and 305d with action agents 310a, 310b and 310c. For example, flow 320 includes path 320c, which specifies that, for a particular application, an input is received at fourth input agent 305c, which passes the input (for example, an image obtained by a camera of an electronic device) to first custom component 315d, which then passes an output to first standard component 315a, which then passes an output to third standard component 315c. Depending on the outcome of the processing undertaken by third standard component 315c, the output of third standard component 315c can be passed on first action agent 310a, second action agent 310b or third action agent 310c. In the case of path 320c, the output is passed to second action agent 310b.

In certain embodiments according to this disclosure, flow 320 can be determined by inserting, into each input to an input agent in application architecture 300, a data block block configured to record the entities with which the input (or processed outputs based on the input) interacts as part of flow 320. In certain embodiments, the data block acquires a tag for each component with which it interacts, and the tags are collected by one or more processes within the set of action agents 310, from which flow 320 can be determined. According to various embodiments, the data block provided with the input to the input agents of the flow comprises a certificate which is signed by each component the certificate passes through.

According to various embodiments of this disclosure, flow 320 can be determined analytically, or pre-computed based on a knowledge of the entities within application architecture 300. That is, in certain embodiments, the operation of each of the entities within application architecture 300 has been verified and can be modeled without inserting a recording data block into the inputs provided to the input agents of the flow.

In certain embodiments, as an alternative to calculating or recording the entirety of flow 320, the input agents and output agents may be determined for the purposes of implementing flow-based permissions according to this disclosure. In some embodiments, the input agents and output agents of flow 320 may be determined analytically, or precomputed based on verified knowledge of the components and terminal (e.g., input and output agents) within application architecture 300. In various embodiments, the input agents and output agents of flow 320 are determined by inserting into each input, a data block for recording input and output agents associated with the input.

According to various embodiments, knowledge of the flows of data and commands for an application or service constructed within application architecture 300, in combination with an awareness of the extent to which components within a flow are, or are not, trusted, permits the creation of common language permission statements. As will be discussed with reference to the non-limiting examples of FIGS. 4 through 6, common language permission statements can provide much more granular permissions than access-control based permissions.

FIG. 4 illustrates an example of generating a flow-based permission statement according to various embodiments of this disclosure. Referring to the non-limiting example of FIG. 4, a flow 400 is depicted.

Flow 400 comprises an input agent 405 which receives GPS data of a user. According to various embodiments, input agent 405 is a process operating on a device which also includes the GPS sensor generating the GPS data. According to various embodiments, flow 400 further comprises first component 410, which, in the non-limiting example of FIG. 4 is a verified component, meaning that the flow of data and commands into and out of first component 410 is understood. According to certain embodiments, first component 410 receives the GPS data provided by input agent 405, and outputs a true false statement as to whether a user in Kansas. In this non-limiting example, second component 415 is also a verified component which, if the user is determined by first component 410 to be in Kansas, performs a determination of whether the day of the week is Monday. If the day of the week is Monday, second component 415 outputs the value "True" to a third party server 420. In the non-limiting example of FIG. 4, first component 410 and second component 415 are provided by black box containers on a cloud platform which is separate from the device providing input agent 405.

In a system implementing access-control based permissions, a user at the device providing input agent 405 may be presented with a request asking that an application be permitted to access GPS data and provide the GPS data to input agent 405. However, in an access-control based permission regime, the user would not be presented with any trustworthy information regarding downstream operations or uses of the data provided to input agent 405.

By contrast, certain embodiments according to this disclosure leverage the knowledge of the flow of data and commands through components of a flow to provide granular common language permission statements. For example, knowledge of the flow of data and commands within flow 400, as well as whether or not the components in the flow are verified or not, enables the generation of common language permission statement, such as "This application collects GPS data and the current time. It uses GPS data to verify if you are in Kansas. It uses the current time to determine if it is Monday. If it is Monday and you are in Kansas, it sends a TRUE statement to a third party server." Depending on embodiments, the common language permission statement is generated based on flow data (for example, signed certificate data) or a pre-calculated flow.

FIG. 5 illustrates an example of generating a flow-based permission statement according to various embodiments of this disclosure. Referring to the non-limiting example of FIG. 5, a flow 500 is depicted.

As shown in the non-limiting example of FIG. 5, flow 500 comprises an input agent 505, a first component 510, a second component 515 and a third party server 520. For the purposes of this illustrative example, with the exception of first component 510, all of the components of flow 500 map to the components of flow 400 in FIG. 4. In contrast to first component 410 in FIG. 4, first component 510 is an unverified, or "custom" component. For the purposes of modelling flow 500, while there may be metadata and other evidence (such as a signed certificate of an input passed through first component 510) indicating how, in certain cases, first component 510 operates, how first component uses the GPS data received from input agent 505 is not known with full certainty. As such, knowledge of the elements within flow 500, and the facts that first component 510 is an unverified component, and second component 515 is a verified component, can be used to generate a common language permission statement of the form, "This application collects GPS data and the current time. It uses the current time to determine if it is Monday. Based on your GPS data and if it is Monday, it may send a TRUE/FALSE statement to a third party server." In this particular example, knowledge of the flow and the points of uncertainty regarding the security of components in the flow, allow the generation of a more nuanced, granular expression of the security risk associated than an access-control based permission simply asking whether an application can use a user's GPS data. Because first component 610 is an unverified component, there is no way of verifying that the GPS data received from input agent 605 is not passed to second component 615. However, the fact that second component 615 is a verified, or "standard" component whose inputs and outputs are confirmed, indicates that, even if second component 615 receives GPS data from first component 610, the GPS data would not be transmitted to third party server 620.

Figure 6:
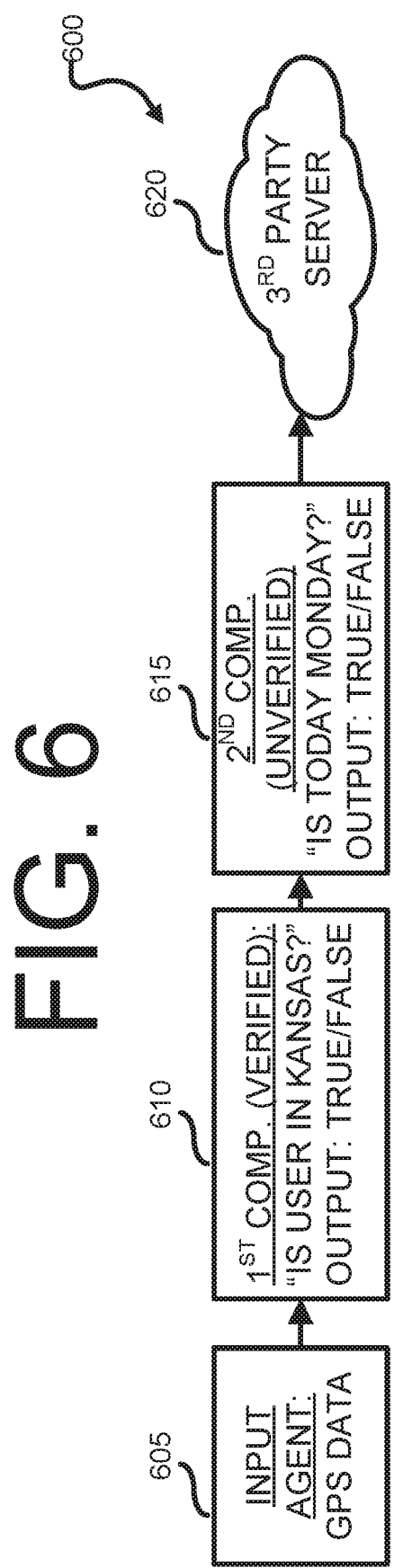
FIG. 6 illustrates an example of generating a flow-based permission statement according to various embodiments of this disclosure.

FIG. 6 illustrates an example of generating a flow-based permission statement according to various embodiments of this disclosure. Referring to the non-limiting example of FIG. 6, a flow 600 is depicted.

As shown in the non-limiting example of FIG. 6, flow 600, like flows 400 and 500 described with reference to FIGS. 4 and 5, comprises an input agent 605, a first component 610 and a second component 615 and a third party server 620. Flow 600 builds off of flow 500 by adding a further layer of uncertainty within the flow between input agent 605 and third party server 620. For the purposes of this illustrative example, with the exception of second component 615, the components of flow 600 map to the components of flow 500 in FIG. 5. In contrast to second component 515 in FIG. 5, second component 615 is an unverified, or "custom" component, meaning that, while a model of flow 600 indicates that the functions of second component 615 include outputting a "True" statement if the day is Monday, a verified model of all of the inputs and outputs of second component 615 does not yet exist.

In certain embodiments, knowledge of the actors within flow 600 and the fact that both first component 610 and second component 615 are unverified, or "custom" components, can be used to provide a common language permission statement which captures, at a more granular level than an access-control permission, the scope of the risk of providing GPS data to input agent 605. For example, knowledge of flow 600 and the fact that both first component 610 and second component 615 are unverified, or "custom" components, can be used to provide a common language permission statement of the form "This application collects GPS data and the current time. It sends your GPS data and the current time to a third party server." In the example of FIG. 6, because first component 610 is an unverified component, there is no way of knowing whether the GPS data is ever filtered out of flow 600, and the common language permission statement reflects an assumption that the GPS data travels "downstream" all the way to third party server 620.

FIG. 7 illustrates an example of operations of a method 700 for implementing flow-based permissions according to various embodiments of this disclosure.

Referring to the non-limiting example of FIG. 7, the operations of method 700 can be performed on one or more computing platforms. For example, an input may be received by an input agent operating on a user device (for example, device 100 in FIG. 100), while the components through which the input is passed are implemented on a separate machine (for example, a cloud server). In some embodiments, the components through which the inputs pass may be implemented on a plurality of machines.

According to certain embodiments, method 700 includes operation 705, wherein an input agent (for example, first input agent 205a in FIG. 2) at an electronic device receives an input, such as an item of data (for example, an image or GPS data) which is to be provided to an application or service built from elements of a modular application architecture (for example, application architecture 200 in FIG. 2).

At operation 705, a data block for recording a path of the input provided to the input agent at operation 705, may also be included with the received input. According to certain embodiments, the data block comprises a certificate which is signed by each component and action agent along the input's path. According to some embodiments, the data block may be provided, along with one or more test inputs, as part of an initialization process for an applet to determine the flow of the applet and, where appropriate, confirm that a modeled flow matches an observed flow.

As shown in the non-limiting example of FIG. 7, at operation 710, the input is passed through a path of components to determine one or more action agents. According to certain embodiments, each action agent within an application architecture (for example, application architecture 200 in FIG. 2) is configured to check the signatures of a certificate or other data block provided with the input received at operation 705, and report its receipt of the data block. In some embodiments according to this disclosure, in addition to the input received at operation 705, additional inputs having values expected to take different paths through the set of components of an application are passed as part of operation 710.

In certain embodiments according to this input, at operation 715, a flow for the input received at operation is determined. In some embodiments, the flow is determined based on the collected signatures (for example, tags) applied by each component through which a data block provided with the input at operation 705 passes. According to other embodiments, the flow for the input is determined analytically, based on the logical connections between input agents, action agents and knowledge of the components within an application architecture. In certain embodiments, for example, when there components specified by the application are verified components, or have other assurances that data passing through the component will not be sent to unknown actors, a compact flow is determined at operation 715, comprising the identity of the input agents and the action agents, may be determined.

According to certain embodiments, the electronic device provides a common language permission statement based on the flow determined at operation 715. In certain embodiments, determination of the common language permission statement is based on pre-tagged functionalities of one or more components in the flow. For example, based on a previous instance of an input being passed through the flow, a tag representing the output destination (for example, third party server 420 in FIG. 4) may be provided to the electronic device, which can be used in the determination of a common language permission statement. Additionally, in some embodiments, the common language permission statement determined at operation 720 is reported through a user interface on the electronic device. In various embodiments according to this disclosure, the common language permission statement is provided to one or more action agents, which determines whether to execute an action based on the common language permission statement.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for flow-based authorization, comprising:
receiving, at an electronic device, an input from an input agent;
obtaining a selection of one or more components, wherein the one or more components comprise at least one of a verified component and an unverified component;
determining, based on the selection of the one of more components, one or more action agents, wherein an action agent comprises an agent configured to perform a specified action based on the input;
identifying a flow for the input, wherein the flow comprises a representation of all possible paths of components between the input agent and the one or more action agents; and
displaying a common language permission statement based on the flow, wherein the common language permission statement is configured to be used by at least one action agent as a basis to execute the specified action.

2. The method of claim 1, wherein the flow for the input is identified based on an applet.

3. The method of claim 1, wherein the common language permission statement is based on pre-tagged functionalities of each of the one or more components.

4. The method of claim 1, wherein the input includes a data block configured for recording paths between the input agent and the one or more action agents.

5. The method of claim 4, wherein the data block comprises a certificate that passes through a path of the one or more components.

6. The method of claim 1, further comprising, determining by the at least one action agent, whether to execute the specified action based on the common language permission statement.

7. An apparatus, comprising:
a processor; and
a memory, comprising program code, which when executed by the processor, causes the apparatus to:
receive, at the apparatus, an input from an input agent;
obtain a selection of one or more components associated with an application, wherein the one or more components comprise at least one of a verified component and an unverified component;
determine, based on the selection of the one or more components, one or more action agents, wherein an action agent comprises an agent configured to perform a specified action based on the input, the agent comprising a software module;
identify a flow for the input, wherein the flow comprises a representation of all possible paths of components between the input agent and the one or more action agents; and
display a common language permission statement based on the flow, wherein the common language permission statement is configured to be used by at least one action agent as a basis to execute the specified action.

8. The apparatus of claim 7, wherein the flow for the input is identified based on an applet.

9. The apparatus of claim 7, wherein the common language permission statement is based on pre-tagged functionalities of each of the one or more components.

10. The apparatus of claim 7, wherein the input includes a data block configured for recording paths between the input agent and the one or more action agents.

11. The apparatus of claim 10, wherein the data block comprises a certificate that passes through a path of the one or more components.

12. The apparatus of claim 7, wherein the memory contains instructions, which, when executed by the processor, cause the apparatus to:
   determine, by the at least one action agent, whether to execute the specified action based on the common language permission statement.

13. A non-transitory computer program product comprising program code, which when executed by a processor, causes an apparatus to:
   receive, at the apparatus, an input from an input agent;
   obtain a selection of one or more components associated with an application, wherein the one or more components comprise at least one of a verified component and an unverified component;
   determine, based on the selection of the one or more components, one or more action agents, wherein an action agent comprises an agent configured to perform a specified action based on the input;
   identify a flow for the input, wherein the flow comprises a representation of all possible paths of components between the input agent and the one or more action agents;
   display a common language permission statement based on the flow, wherein the common language permission statement is configured to be used by at least one action agent as a basis to execute the specified action.

14. The non-transitory computer program product of claim 13, wherein the flow for the input is identified based on an applet.

15. The non-transitory computer program product of claim 13, wherein the common language permission statement is based on pre-tagged functionalities of each of the one or more components.

16. The non-transitory computer program product of claim 13, wherein the input includes a data block configured for recording paths between the input agent and the one or more action agents.

17. The non-transitory computer program product of claim 16, wherein the data block comprises a certificate that passes through a path of the one or more components.

* * * * *